United States Patent [19]
Morris et al.

[11] Patent Number: 4,865,162
[45] Date of Patent: Sep. 12, 1989

[54] ELECTRICALLY ACTUATED AIRCRAFT BRAKES

[75] Inventors: Rick Morris, Akron; Moseley Douglas D., Uniontown; Gary M. Rimlinger, North Canton; Thomas L. Soldat, Medina, all of Ohio

[73] Assignee: Opus Acquisition Corporation, Akron, Ohio

[21] Appl. No.: 941,893

[22] Filed: Dec. 15, 1986

[51] Int. Cl.⁴ .................... F16D 55/08; B60L 7/00
[52] U.S. Cl. .................... 188/72.8; 188/158; 310/80
[58] Field of Search .......... 188/71.9, 72.7, 72.8, 188/73.45, 153, 162, 106 P; 303/20, 100; 310/77, 80, 83; 384/550

[56] References Cited

U.S. PATENT DOCUMENTS

| | | | |
|---|---|---|---|
| 2,938,607 | 5/1960 | Kershner et al. | 188/72.8 |
| 3,093,213 | 6/1963 | Limoges et al. | 188/106 P |
| 3,677,372 | 7/1972 | Burnett | 188/73.45 |
| 3,724,609 | 4/1973 | Kobald | 188/106 P |
| 3,809,191 | 5/1974 | Woodward | 188/106 P |
| 4,037,893 | 7/1977 | Perrin | 384/550 |
| 4,315,174 | 2/1982 | Doerr | 310/83 X |
| 4,432,440 | 2/1984 | Crossman | 188/71.9 |
| 4,494,025 | 1/1985 | Fickler | 310/80 |
| 4,529,067 | 7/1985 | Scott | 188/72.8 |
| 4,542,809 | 11/1985 | Crossman | 188/72.8 |
| 4,596,316 | 6/1986 | Crossman | 188/72.8 X |
| 4,602,702 | 7/1986 | Ohta et al. | 303/20 |
| 4,658,939 | 4/1987 | Kircher et al. | 188/72.8 |

FOREIGN PATENT DOCUMENTS

| | | | |
|---|---|---|---|
| 1255855 | 1/1961 | France | 188/162 |
| 2156021 | 10/1985 | United Kingdom . | |

OTHER PUBLICATIONS

SKF Transol Brochure: "Transrol High Efficiency Ball and Roller Screws", 5-83; pp. 4-5.

Primary Examiner—Andres Kashnikow
Assistant Examiner—Timothy Newholm
Attorney, Agent, or Firm—L. A. Germain; P. E. Milliken

[57] ABSTRACT

This invention provides a roller screw drive mechanism (60) driven by an electric torque motor (50) through a gear drive (58,58',58") associated with either the screw (64,94) or nut (62,92) member of the roller screw drive mechanism. Rotation of the gear drive (58, 58', 58") by the torque motor (50) effectively moves the other member of the roller screw drive mechanism into axial engagement with the brake pressure plate (32) for braking action in response to an electrical control signal fed to the torque motor. A plurality of torque motor driven roller screw drive mechanisms are mounted in a balanced arrangement about the axis of the wheel and brake assembly to effectively apply and release a brake pressure force on the brake pressure plate in response to an electrical control signal to the torque motors.

21 Claims, 5 Drawing Sheets

ELECTRICALLY ACTUATED AIRCRAFT BRAKES

BACKGROUND OF THE INVENTION

This invention relates to aircraft brakes wherein brake actuation and release are achieved by electrical control as opposed to hydraulic control. Hydraulically controlled aircraft braking systems are, of course, well known in the prior art.

More particularly, this invention provides a brake wherein a plurality of electric torque motors effect wheel braking through reciprocating control means which operate to compress a multi-disk stack of frictional braking elements.

Electrically actuated aircraft brakes of various configurations are already known as exemplified in U.S. Pat. Nos. 4,381,049; 4,432,440; 4,542,809; and 4,567,967. All of these are by Richard L. Crossman and assigned to Goodyear Aerospace Corporation, Akron, Ohio. The inventions described and illustrated in the above-referenced patents pertain to reciprocating control means in various configurations of a ball-screw drive wherein electric torque motors responding to an electrical control signal from the pilot effect rotation of a ring gear member which interacts through a plurality of balls to drive an axially positioned and linearly moving ram member into contacting engagement with a brake pressure plate. The brake pressure plate effects compression of a brake disk stack to stop a rotating wheel. The ball-screw drive mechanism is in an annular configuration about the axis of rotation of the wheel and applies a braking pressure force in the axial direction on the pressure plate which is an annular disk at the inboard end of the brake disk stack of frictional braking elements.

Another configuration of an electrically actuated brake is described in U.S. Pat. No. 4,596,316 to R. L. Crossman and also assigned to Goodyear Aerospace Corporation. According to this patent, a reciprocating control means is in the form of a roller screw drive wherein a ring gear member interacts through a plurality of roller screws to drive a ram member into engagement with the brake pressure plate to effect compression of the brake disk stack for braking action. A plurality of electric torque motors and their associated pinions drive a ring gear into rotation and the plurality of roller screws effect linear axial movement of the ram member.

Nut-and-screw drives, which convert rotary input motion to a linear output motion, are already known as exemplified in U.S. Pat. No. 3,595,094 assigned to Aktiebolaget Svenska Kullagerfabriken; U.S. Pat. No. 4,576,057 assigned to Illinois Tool Works, Inc.; and U.S. Pat. No. 4,037,893 assigned to La Technique Integrale. La Technique Integrale of Chambery, France is a primary producer of such drive mechanisms and these are marketed in the U.S. by SKF International under the tradename TRANSROL.

This invention is directed to a configuration of a roller screw drive of the planetary or recirculating roller screw type wherein each electric torque motor of a plurality of such motors drives an individual roller screw mechanism through a right-angle gearhead and the linear moving member of the roller screw drive mechanism makes contacting engagement with the brake pressure plate to effect braking action of a rotating aircraft wheel. The torque motors and their associated gearheads and roller screw drives are mounted in various configurations and in a balanced arrangement about the axis of rotation of the wheel and brake assembly.

The embodiments of the invention described and claimed herein are directed to the arrangement of torque motors and the reciprocating control means and do not elaborate upon the means by which the pilot of the aircraft may apply the electrical control signals to the torque motors which drive the reciprocating control means. Any type of electric brake controller which regulates the direction of current flow to the torque motors to achieve either brake application or brake release may be applied to the invention. A particular one such electronic controller is described in U.S. Pat. No. 4,568,863 to Edgar J. Ruof and assigned to Goodyear Aerospace Corporation, Akron, Ohio.

SUMMARY OF THE INVENTION

This invention provides a reciprocating control for operative axial engagement with a brake disk stack through a pressure plate of a wheel and brake assembly to compress the brake disk stack for braking of a rotatable wheel in response to an electrical input signal comprising in combination:

a roller screw drive mechanism mounted axially with respect to the brake pressure plate and having (a) an exteriorly threaded screw member, (b) an internally threaded nut member positioned axially about the screw member, and (c) a plurality of threaded rollers mounted internally within the nut member for interaction between the screw and nut members to move one of the members linearly and axially with respect to the other when one of said members is rotated;

gear drive means fixedly secured to the relatively stationary member of the roller screw drive mechanism; and at least one electrically responsive torque motor effecting rotational motion of the gear drive means such that the axially moving member of the roller screw drive mechanism effects application and release of a pressure force on the brake pressure plate in response to an electrical control signal.

BRIEF DESCRIPTION OF THE DRAWINGS

The details of the invention and various advantages thereof will be better appreciated and understood from a consideration of the following detailed description and the accompanying drawings, in the several figures in which like reference numerals indicate like elements and wherein.

DETAILED DESCRIPTION OF THE INVENTION

Figure 1:
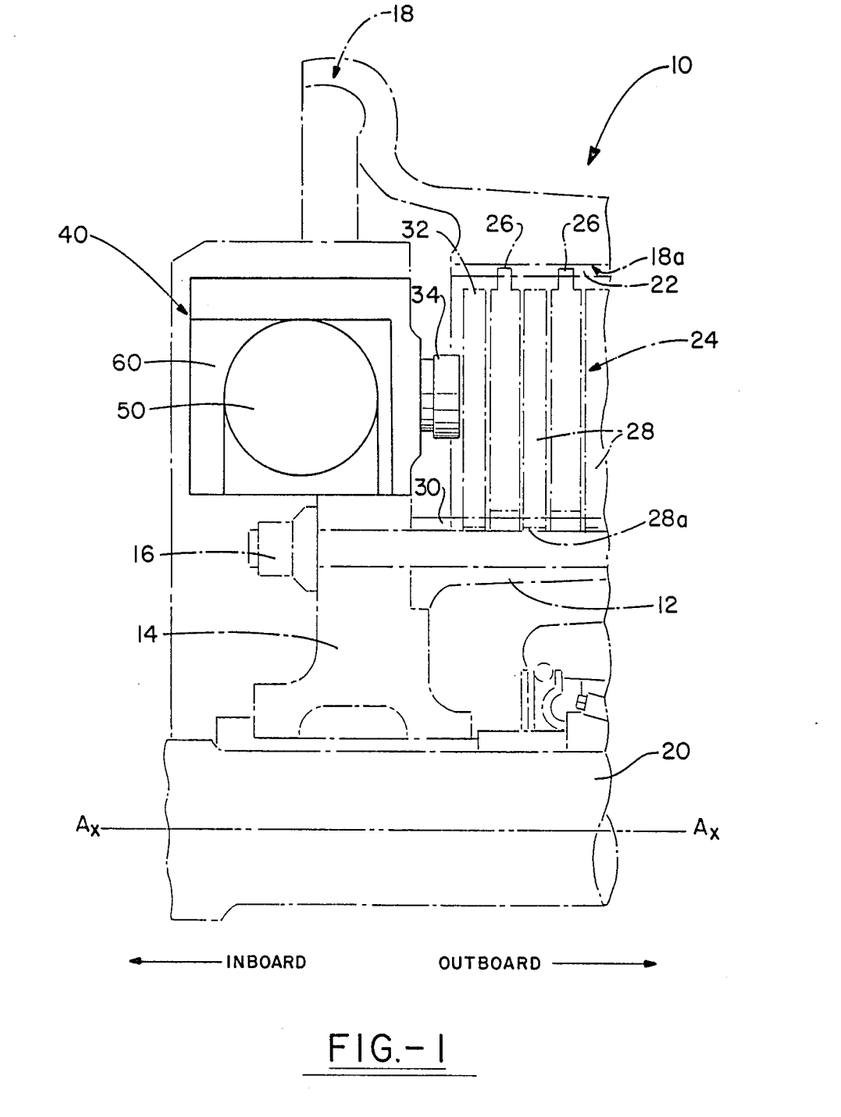
FIG. 1 is a partial cross-sectional view through one half of a wheel and brake assembly which is operative about an axis of rotation indicated at $A_x - A_x$ and showing a reciprocating control means in accordance with this invention in solid lines as it may be associated with various conventional elements of such wheel and brake assembly and these are shown in ghost via dot-dashed lines.

Referring to FIG. 1 of the drawings, a wheel and brake assembly is generally indicated by reference numeral 10, the conventional elements thereof being shown by dot-dashed ghost lines and a reciprocating control means according to this invention being indicated generally by reference numeral 40 and illustrated in solid lines.

The conventional elements of a wheel and brake assembly 10 include a torque tube 12 fixedly secured to a brake housing 14 by a plurality of bolts 16 and a wheel rim 18 rotatably carried by an axle 20 and adapted for mounting an inflatable tire thereon (the tire not shown). The axis of rotation of the rotating elements of the wheel and brake assembly 10 is indicated by line $A_x$—$A_x$. The wheel rim 18 includes a plurality of drive keys 22 located about the inner peripheral surface indicated at 18a and these engage a plurality of rotatable friction disks 26 which are alternate ones of a brake disk stack generally indicated by reference numeral 24. The disks 26 are, of course, rotatable with the wheel 18 while other alternate ones of the brake disk stack are relatively stationary disks 28 which are keyed about an inner peripheral surface indicated at 28a to keys 30 formed about the outer peripheral surface of the torque tube 12. The disks 26,28 are therefore functional to provide braking of the wheel 18 when they are compressed in the axial direction by a forceful engagement imparted by a brake pressure plate 32 positioned at the inboard end of the disk stack 24. Of course, the disk stack compression is effected by a back plate disk (not shown) or a radial extension (not shown) of the torque tube 12 at the outboard end of the disk stack in the well known manner of such multi-disk brake assemblies.

The pressure plate 32 is also positioned for operative engagement with a plurality of reciprocating control means 40, which control means form a brake actuator functioning to compress the brake disk stack 24 for braking of the wheel 18. The reciprocating control means 40 each generally comprises a torque motor 50 which drives a ram member 34 into forceful and contacting engagement with the pressure plate 32. Such engagement of the ram member 34 is effected by a roller screw drive mechanism 60, and this, either by one or the other of a nut or screw member of the roller screw drive mechanism dependent upon which one is adapted to be a ram member for axial and linear movement within the mechanism. This will be more fully appreciated and understood hereinafter with respect to FIGS. 2 and 3 of the drawings.

Figure 5:
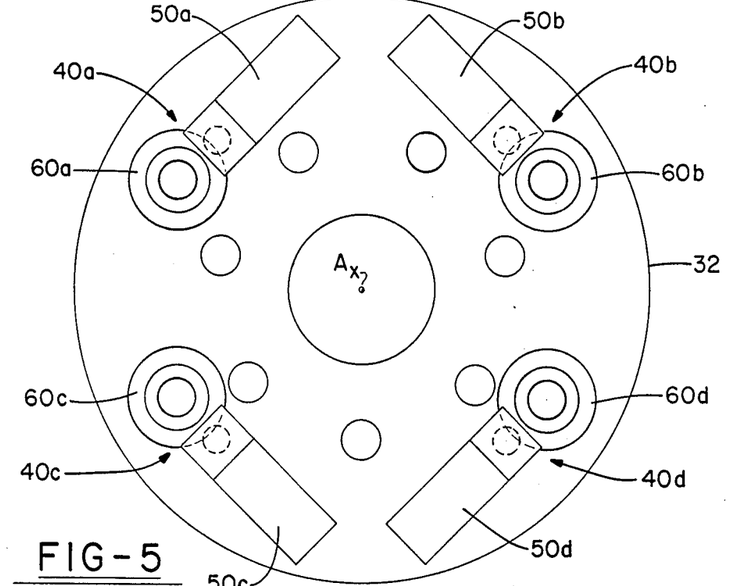
FIG. 5 is a diagramatic elevational view along the $A_x$—$A_x$ axis as may be taken from the inboard end toward the outboard end of the brake assembly illustrating a mounting configuration wherein each torque motor of a group drives a single roller screw drive mechanism for braking action.
Figure 6:
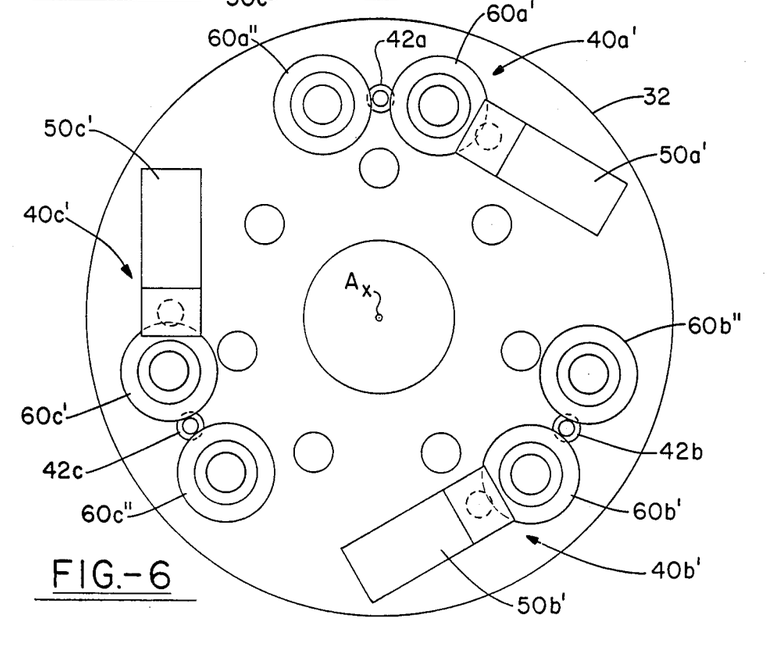
FIG. 6 is a diagramatic elevational view similar to FIG. 5 wherein each torque motor of a group drives a pair of roller screw drive mechanisms into engagement with a brake pressure plate for braking action.

Referring firstly now to FIGS. 5 and 6 of the drawings, two mounting configurations of the reciprocating control means 40 are diagramatically illustrated. In FIG. 5 reciprocating control means 40a, 40b, 40c, and 40d have individual torque motors 50a–50d mounted to drive roller screw mechanisms 60a–60d and these are positioned in a substantially balanced arrangement about the axis of rotation indicated at $A_x$. Obviously, it can be appreciated that a ram member of each roller screw mechanism 60a–60d effects an axial movement of the annular-shaped pressure plate 32 which is positioned at the outboard end of the reciprocating control means 40a–40d. With reference to FIG. 6, an alternative embodiment is illustrated wherein individual torque motors 50a'–50c' are positioned such that each motor drives a pair of roller screw mechanisms indicated at (60a',60a''), (60b',60b''), and (60c',60c'') respectively. For example, torque motor 50a' drives roller screw mechanism 60a' which effectively drives a second roller screw mechanism 60a'' through an idler gear 42a.

The particular configurations illustrated in FIGS. 5 and 6 are shown for the purpose of example only and other mounting arrangements will come to mind depending upon various factors which may be considered in a particular wheel and brake application. For example, a wheel and brake configuration for a jumbo jetliner will require a different set of torque motor/roller screw drive specifications than a wheel and brake configuration for a small business aircraft. Furthermore, various elements and parameters may be specified for a particular aircraft wheel and brake system such as for example: numbers of torque motors; motor output torque; gearhead ratio; idler gear ratio; and roller screw pitch. More specifically the number of torque motors may vary from 2–10 and these may have torque outputs within the range of 50–200 in-oz while the right angle gearhead ratios may vary from 4:1 to 20:1 and the idler gears may effect a ratio within the range of 1:1 to 5:1. The roller screw pitch may also vary between 0.040–0.125 inches and obviously, all or only some of these elements may be combined in various ways to produce the desired clamping force to actuate a particular aircraft brake and this will become apparent as this description proceeds to persons having knowledge and skill in the aircraft braking arts.

Figure 2:
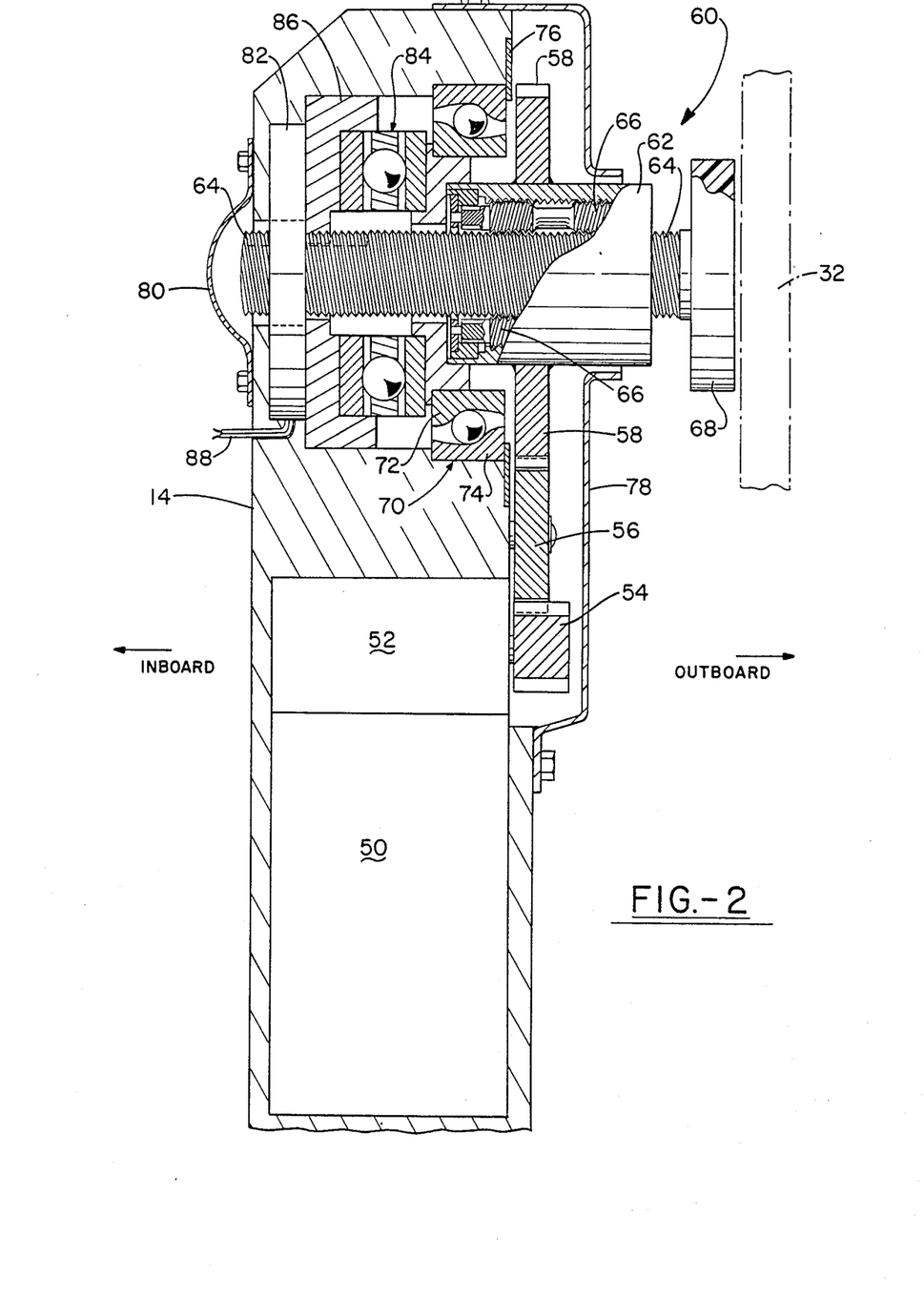
FIG. 2 is a plan view, in partial cross-section, illustrating a first embodiment of the invention wherein a torque motor effects rotation of a nut member of a roller screw drive mechanism to move a screw member axially into forceful engagement with a brake pressure plate for braking action.

Continuing with reference to FIG. 2 of the drawings, a first embodiment of the invention is illustrated and comprises a torque motor 50 mounted within the brake housing 14 in a manner to drive a right angle gearhead 52 which has an output pinion gear 54. The pinion gear 54 drives an idler gear 56 which in turn effects rotation of a matching gear member 58 which is part and parcel of a roller screw drive mechanism indicated generally by reference numeral 60. The gear member 58 is fixedly secured or attached to the nut member 62 of the roller screw drive mechanism such as to rotate in drive synchronism therewith. The nut member 62 is adapted to rotate with an inner race 72 of a bearing 70 while an outer race 74 is secured within the brake housing 14 by a stop means 76. A screw member 64 of the roller screw mechanism 60 is mounted axiallY through the nut member 62 and is driven by a plurality of roller screws 66 which are effectively rotated by the rotational movement of the nut member 62. The roller screws 66 may be mounted for recirculation in any one of a number of configurations known to those persons knowledgeable of this art or alternatively they may be mounted in a planet roller or planetary roller drive configuration shown in the drawing. In any event, the screw member 64 is effectively moved axially by interaction with the roller screws 66 such as to effect a forceful engagement of a ram pad 68 affixed to its outboard end with the brake pressure plate 32 (shown in ghost lines). Thus, the screw member 64 effectively operates as the ram member (34 of FIG. 1) in this configuration. The ram pad 68 may be made of any type material, but a heat-resistant or insulative-type material is preferred. The reciprocating control means 60 is sealed against pollution generated in the brake assembly environment by an outboard facing seal 78 and by an inboard facing seal 80.

Because a reverse thrust force is imparted by the screw member 64 to the nut member 62 through the roller screws 66 when an output force is applied to the brake pressure plate 32, a control signal may be generated in a load cell 82 mounted at the inboard end of the nut member 62. The mounting is accomplished through a securing of the nut member 62 to one side of a thrust bearing 84, the opposite side of the thrust bearing being connected to the load cell 82 through an antirotation cup 86. The anti-rotation cup 86 is adapted to restrict rotation of the screw member 64 while allowing it to move axially for braking action. Any type mounting configuration may be used to accomplish this. In any event, a signal generated in the load cell 82 and provided at outputs 88 is useful in an antiskid control system as applied to aircraft braking since such signal is a direct reading of the braking force applied to the brake disk stack. Without elaborating on this point, it will suffice to say that such electrically generated signal may be applied to aircraft antiskid control systems in a manner known and understood by persons working in that art.

Figure 3:
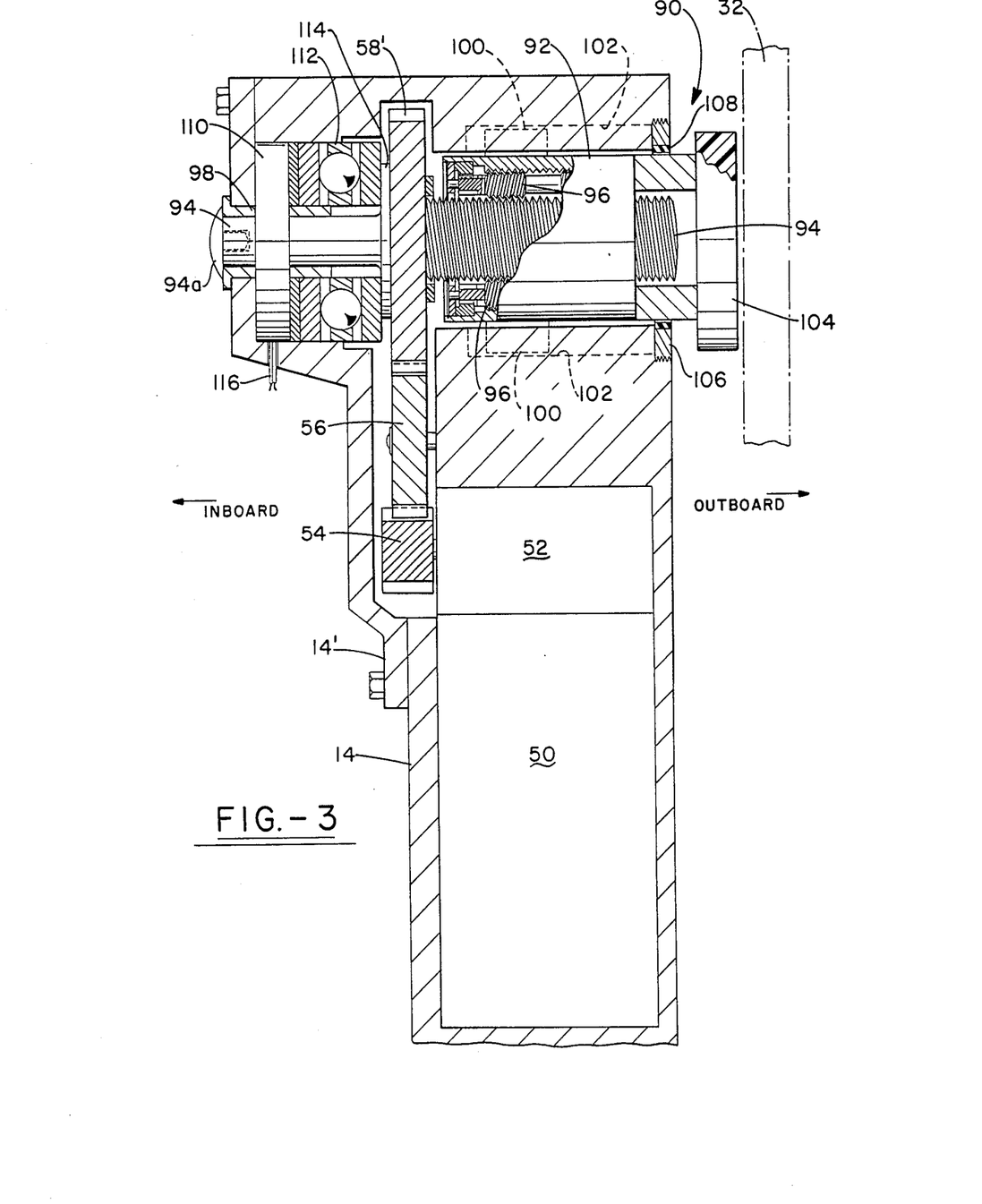
FIG. 3 is a plan view, in partial cross-section, illustrating a second embodiment of the invention wherein a torque motor effects rotation of a screw member of a roller screw drive mechanism to move a nut member axially into forceful engagement with a brake pressure plate for braking action.

FIG. 3 of the drawings illustrates a second embodiment of the invention wherein a torque motor 50 drives a right angle gearhead 52 which in turn drives an idler gear 56 by way of its output pinion gear 54. However, in this embodiment, the right angle gearhead 52 faces inboardly instead of outboardly (as shown in FIG. 2) and this to accommodate an arrangement of a roller screw drive mechanism generally indicated by reference numeral 90. In this embodiment the idler gear 56 engages and drives a gear member 58' that is part and parcel of a screw member 94 of the roller screw mechanism 90. The gear member 58' is fixedly secured to the screw member 94 such as to effect rotation of the screw member which is mounted to be axially stationary. The screw member 94 is mounted in a bearing sleeve or bushing 98 at its inboard end and is limited by a head portion 94a to any axial movement in the outboard direction. The screw member 94 is threaded along its length outboardly of the gear member 58' and carries a nut member 92 thereon by reason of a plurality of interacting roller screws 96 and these may be either of the recirculating or planetary drive type. The nut member 92 is restrained from any rotational motion by a plurality of anti-rotation clips 100 which are carried in axially-oriented channels 102, and thus, upon rotational motion of the screw member 94 and the associated roller screws 96, the nut member translates axially along the screw member. In this configuration, the nut member 92 carries a ram pad attachment 104 at its outboard end and this to effect a forceful engagement with the brake pressure plate 32 (shown in ghost lines). A stop 106 is provided at the outboard end which effectively limits the axial excursion of the nut member in the outboardly direction. The stop 106 may also include a seal means 108 which isolates the roller screw mechanism from pollutants generated in the brake assembly. Thus, the nut member 92 effectively operates as the ram member (34 of FIG. 1) in this configuration.

Again, and because a reverse thrust force is generated in the roller screw mechanism 90 upon application of a braking force on the pressure plate 32, a control signal may be generated in a load cell 110 mounted at the inboard end of the roller screw mechanism. In this embodiment, the drive gear member 58' effects a reverse thrust force on one side of a thrust bearing 112, through a collar 114, the opposite side applying the force to the load cell 110 which generates a signal output at 116 indicative of such force and which may be applied to an aircraft antiskid control system.

Figure 4:
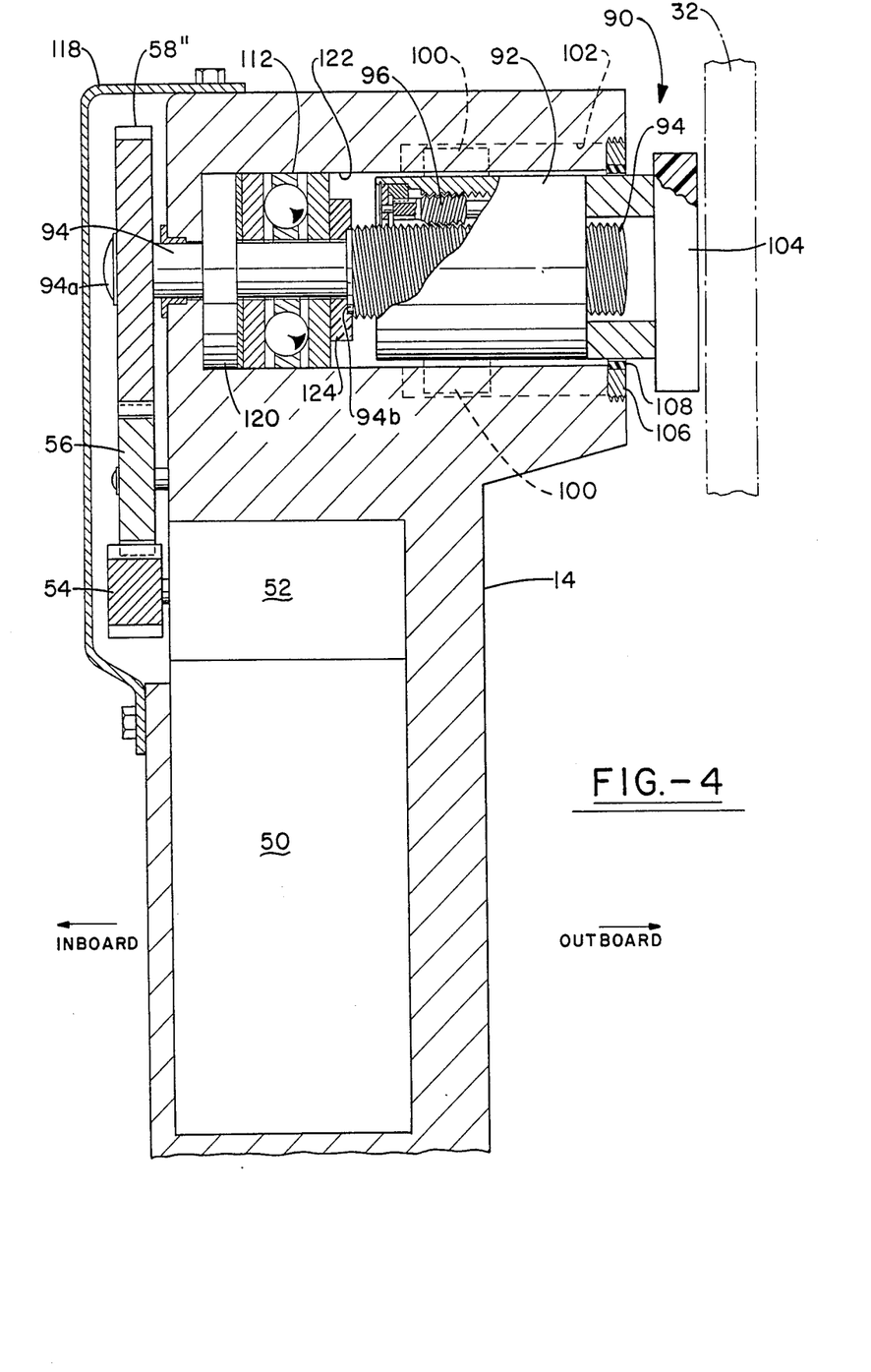
FIG. 4 is a plan view, in partial cross-section and similar to FIG. 3 of a second configuration wherein a torque motor effects rotation of a screw member of a roller screw drive mechanism to move a nut member axially into forceful engagement with a brake pressure plate for braking action.

FIG. 4 of the drawings illustrates an embodiment of the invention similar to FIG. 3 wherein a rotatable screw member 94 effects a linear axial translation of a nut member 92 through interaction of a plurality of roller screws 96. However, according to this embodiment, a gear drive indicated by reference numeral 58" is positioned inboardly of the housing 14 which carries the threaded end of the screw member 94 and the axially movable nut member 92 within a housing bore 122. This arrangement simplifies the housing configuration inasmuch as the bore 122 may be machined into one side of the housing. Accordingly, the gear drive including the pinion gear 54, the idler gear 56, and the drive gear 58" are all positioned inboardly and outside of the housing 14. A seal plate 118 may be used to isolate the gearing members from pollutants generated in the wheel and brake assembly. Contrasting this arrangement, the embodiment of FIG. 3 has a separate housing piece 14' which cooperates with the housing 14 in the mounting of the roller screw drive mechanism 90.

Further with respect to FIG. 4, a load cell 120 is mounted at the inboard extent within the housing bore 122 and it is responsive to a reverse load applied to a thrust bearing 112 through a disk piece 124 which is mounted at the inboard end of the threaded portion of the screw member 94. A collar 94b provides a means to transmit the reverse load on the screw member to the disk piece 124 and thus to the thrust bearing 112 and load cell 120 as the nut member 92 translates axially along the screw and engages the brake pressure plate 32 (shown in ghost lines).

While certain representative embodiments and details have been shown or described in detail for the purpose of illustrating the invention, it will be apparent to those skilled in the art that various changes and modifications may be made therein without departing from the spirit or scope of the invention.

What is claimed is:

1. A reciprocating control for operative engagement with a brake disk stack through a pressure plate of a wheel and brake assembly to compress the brake disk stack for braking of a rotatable wheel in response to an electrical input signal comprising in combination:

a roller screw drive mechanism mounted in relative position to engage the brake pressure plate comprising (a) an exteriorly threaded screw member having an axis of rotation radially offset from and parallel to a central axis of the pressure plate, (b) an internally threaded nut member positioned axially about the screw member, and (c) a plurality of threaded rollers mounted internally within the nut member for interaction between the screw and nut members such as to move one of the members axially relative to the other member which is rotated about the common axis;

gear drive means fixedly secured to the nut member that is rotated about the common axis; and an electrically responsive torque motor mounted to effect rotation of the gear drive means such that the axially moving screw member of the roller screw drive mechanism effects the application and release of a brake pressure force on the pressure plate in accordance with the electrical input signal.

2. The reciprocating control as set forth in claim 1 further comprising a right angle gearhead and an idler gear, said torque motor operatively connected to the gearhead which interacts with the idler gear to drive the gear drive means into rotation.

3. The reciprocating control as set forth in claim 1 further comprising a load cell, an anti-rotation load cup, and a thrust bearing, said nut member effecting a reverse pressure force on the thrust bearing which is transmitted to the load cell through the anti-rotation cup in response to a forceful engagement of the screw member with the brake pressure plate.

4. The reciprocating control as set forth in claim 1 wherein the roller screw drive mechanism is in the configuration of a planetary roller screw drive.

5. The reciprocating control as set forth in claim 1 wherein the roller screw drive mechanism is in the configuration of a recirculating roller screw drive.

6. In an electrically actuated aircraft brake assembly for braking a rotatable wheel by compression of a multidisk stack of frictional braking elements, a reciprocating control for operative engagement with the disk stack through a brake pressure plate at the inboard end of the brake disk stack to apply a braking pressure force in the outboard direction which axially compresses the brake disk stack comprising in combination:

at least two roller screw drive mechanisms mounted inboardly and in a balanced arrangement about the central axis of the pressure plate, each said mechanism comprising (a) an exteriorly threaded screw member having an axis of rotation radially offset from and in parallel alignment with the axis of the pressure plate, (b) an internally threaded nut member positioned axially about the screw member, and (c) a plurality of threaded rollers mounted internally within the nut member such as to move one of the members axially relative to the other member which is adapted for rotation about their common axis;

a gear drive means fixedly secured to each nut member that is adapted for rotation; and an electrically responsive torque motor mounted in association with each of said roller screw drive mechanisms to effect rotation of the gear drive means such that the axially moving screw member of each of said roller screw drive mechanisms effects application and release of a braking pressure force on the pressure plate in response to the electrical input signals to said torque motors.

7. The reciprocating control as set forth in claim 6 further comprising a right angle gearhead and an idler gear associated with each of said roller screw drive mechanisms wherein each of said torque motors is operatively connected to a respective gearhead for interaction with the idler gear to drive the gear drive means into rotation.

8. The reciprocating control as set forth in claim 6 further comprising a load cell, an anti-rotation load cup, and a thrust bearing associated with at least one of said roller screw drive mechanisms wherein a nut member effects a reverse pressure force on the thrust bearing which is transmitted to the load cell through the anti-rotation cup in response to a forceful engagement of the respective screw member with the brake pressure plate.

9. The reciprocating control as set forth in claim 6 wherein each roller screw drive mechanism is in the configuration of a planetary roller screw drive.

10. The reciprocating control as set forth in claim 6 wherein each roller screw drive mechanism is in the configuration of a recirculating roller screw drive.

11. In an electrically actuated aircraft brake adapted for braking a rotatable wheel by compression of a multidisk stack of frictional braking elements, a reciprocating control for operative engagement with the disk stack through a pressure plate to apply and release a braking pressure force on the disk stack comprising in combination:

a plurality of roller screw drive mechanisms mounted in relative axial positions to the disk stack, each said mechanism comprising (a) an externally threaded screw member having an axis in parallel alignment with a central axis of the pressure plate, (b) an internally threaded nut member positioned axially about the screw member, and (c) a plurality of roller screws mounted within the nut member to provide an inter-engagement between the screw and nut members, one said member being adapted for rotational motion while the other member is moved axially to engage the pressure plate when the one said member is rotated;

a gear drive means fixedly secured to the one member of each said roller screw drive mechanism that is adapted for rotational motion;

a plurality of idler gears, the number being equal to one-half the number of roller screw drive mechanisms and one such idler gear being positioned between a pair of gear drive means such that when one of said gear drive means is rotated the other of the pair is rotated in drive synchronism; and a plurality of electric torque motors, the number being equal to one-half the number of roller screw drive mechanisms, each said torque motor mounted to drive one of the pair of gear drive means associated with an idler gear, such that when an electrical brake control signal is fed to the plurality of torque motors each said torque motor drives a pair of roller screw drive mechanisms and the axially moving members of all said roller screw drive mechanisms apply a braking pressure force to the pressure plate.

12. A reciprocating control for operative engagement with a brake disk stack through a pressure plate of a wheel and brake assembly to compress the brake disk stack for braking of a rotatable wheel in response to an electrical input signal characterized by:

a roller screw drive mechanism mounted in relative position to engage the brake pressure plate comprising (a) an exteriorly-threaded screw member having an axis of rotation radially offset from and parallel to a central axis of the pressure plate, (b) an internally-threaded nut member positioned axially about the screw member and (c) a plurality of threaded rollers mounted internally within the nut member for interaction between the screw and nut members such as to move the nut member axially relative to the screw member which is mounted for rotation about the common axis;

gear drive means fixedly secured to the screw member;

a right angle gearhead and an idler gear, the idler gear mounted for interaction with the gear drive means; and an electrically-responsive torque motor operatively mounted to effect rotation of the gear drive means through the right angle gearhead such that the axially moving nut member of the roller screw drive mechanism effects the application and release of a brake pressure force on the pressure plate in accordance with the electrical input signal.

13. A reciprocating control for operative engagement with a brake disk stack through a pressure plate of a wheel and brake assembly to compress the brake disk stack for braking of a rotatable wheel in response to an electrical input signal characterized by:

a roller screw drive mechanism mounted in relative position to engage the brake pressure plate comprising (a) an exteriorly-threaded screw member having an axis of rotation radially offset from and parallel to a central axis of the pressure plate, (b) an internally-threaded nut member positioned axially about the screw member and (c) a plurality of threaded rollers mounted internally within the nut member for interaction between the screw and nut members such as to move the nut member axially relative to the screw member which is mounted for rotation about the common axis;

gear drive means fixedly secured to the screw member;

a load cell and thrust bearing mounted for operative engagement with the screw member, the screw member effecting a reverse pressure force on the thrust bearing which is transmitted to the load cell in response to a forceful engagement of the axially moving nut member with the pressure plate; and an electrically-responsive torque motor operatively mounted to effect rotation of the gear drive means such that the axially moving nut member effects the application and release of a brake pressure force on the pressure plate in accordance with the electrical input signal.

14. The reciprocating control as set forth in claim 13 wherein the roller screw drive mechanism is in the configuration of a planetary roller screw drive.

15. The reciprocating control as set forth in claim 13 wherein the roller screw drive mechanism is in the configuration of a recirculating roller screw drive.

16. In an electrically-actuated aircraft brake assembly for braking a rotatable wheel by compression of a multi-disk stack of frictional braking elements, a reciprocating control for operative engagement with the disk stack through a brake pressure plate at the inboard end of the brake disk stack to apply a braking pressure force in the outboard direction which axially compresses the brake disk stack characterized by:

at least two roller screw drive mechanisms mounted inboardly and in a balanced arrangement about the central axis of the pressure plate, each said mechanism comprising (a) an exteriorly-threaded screw member having an axis of rotation radially offset from and in parallel alignment with the axis of the pressure plate, (b) an internally-threaded nut member positioned axially about the screw member, and (c) a plurality of threaded rollers mounted internally within the nut member such as to move the nut member axially relative to the screw member which is adapted for rotation about their common axis;

a gear drive means fixedly secured to each said screw member that is adapted for rotation;

a right angle gearhead and an idler gear mounted for operative engagement with each of said gear drive means; and an electrically-responsive torque motor mounted in association with each of said right angle gearheads to effect rotation of the gear drive means through the idler gear such that the axially moving nut member of each of said roller screw drive mechanisms effects application and release of a braking pressure force on the pressure plate in response to the electrical input signals to said torque motors.

17. In an electrically-actuated aircraft brake assembly for braking a rotatable wheel by compression of a multi-disk stack of frictional braking elements, a reciprocating control for operative engagement with the disk stack through a brake pressure plate at the inboard end of the brake disk stack to apply a braking pressure force in the outboard direction which axially compresses the brake disk stack characterized by:

at least two roller screw drive mechanisms mounted inboardly and in a balanced arrangement about the central axis of the pressure plate, each said mechanism comprising (a) an exteriorly-threaded screw member having an axis of rotation radially offset from and in parallel alignment with the axis of the pressure plate, (b) an internally-threaded nut member positioned axially about the screw member, and (c) a plurality of threaded rollers mounted internally within the nut member such as to move the nut member axially relative to the screw member which is adapted for rotation about the common axis;

a gear drive means fixedly secured to each said screw member that is adapted for rotation;

a load cell and a thrust bearing operatively mounted with respect to a screw member of at least one of said roller screw drive mechanisms wherein a reverse brake pressure force is imparted on the thrust bearing which is transmitted to the load cell in response to a forceful engagement of the respective nut member with the brake pressure plate; and an electrically-responsive torque motor mounted in association with each of said roller screw drive mechanisms to effect rotation of the gear drive means such that the axially moving nut member of each of said roller screw drive mechanisms effects application and release of a braking pressure force on the pressure plate in response to the electrical input signals to said torque motors.

18. The reciprocating control as set forth in claim 17 wherein each roller screw drive mechanism is in the configuration of a planetary roller screw drive.

19. The reciprocating control as set forth in claim 17 wherein each roller screw drive mechanism is in the configuration of a recirculating roller screw drive.

20. A reciprocating control for operative engagement with a brake disk stack through a pressure plate of a wheel and brake assembly to compress the brake disk stack for braking of a rotatable wheel in response to an electrical input signal characterized by:

a roller screw drive mechanism mounted in relative position to engage the brake pressure plate comprising (a) an exteriorly-threaded screw member having an axis of rotation radially offset from and parallel to a central axis of the pressure plate, (b) an internally-threaded nut member positioned axially about the screw member and (c) a plurality of threaded rollers mounted internally within the nut member for interaction between the screw and nut members such as to move the nut member axially relative to the screw member;

gear drive means fixedly secured to the screw member which is rotated about the common axis;

an electrically-responsive torque motor mounted to effect rotation of the gear drive means such that the axially moving nut member of the roller screw drive mechanism effects the application and release of a brake pressure force on the pressure plate in accordance with the electrical input signal.

21. In an electrically-actuated aircraft brake assembly for braking a rotatable wheel by compression of a multi-disk stack of frictional braking elements, a reciprocating control for operative engagement with the disk stack through a brake pressure plate at the inboard end of the brake disk stack to apply a braking pressure force in the outboard direction which axially compresses the brake disk stack characterized by:

at least two roller screw drive mechanisms mounted inboardly and in a balanced arrangement about the central axis of the pressure plate, each said mechanism comprising (a) an exteriorly-threaded screw member having an axis of rotation radially offset from and in parallel alignment with the axis of the pressure plate, (b) an internally-threaded nut member positioned axially about the screw member, and (c) a plurality of threaded rollers mounted internally within the nut member such as to move the nut member axially relative to the screw member which is adapted for rotation about their common axis;

a gear drive means fixedly secured to each screw member that is adapted for rotation; and an electrically-responsive torque motor mounted in association with each of said roller screw drive mechanisms to effect rotation of the gear drive means such that the axially moving nut member of each of said roller screw drive mechanisms effects application and release of a braking pressure force on the pressure plate in response to the electrical input signals to said torque motors.

* * * * *